United States Patent

Lang et al.

[15] 3,701,039

[45] Oct. 24, 1972

[54] RANDOM BINARY DATA SIGNAL FREQUENCY AND PHASE COMPENSATION CIRCUIT

[72] Inventors: Paul C. Lang; Anthony N. La Pine, both of San Jose; Julian E. Vaughn, Campbell, all of Calif.

[73] Assignee: International Business Machines Corporation, Armonk, N.Y.

[22] Filed: Oct. 28, 1968

[21] Appl. No.: 771,205

[52] U.S. Cl. .......................331/1 A, 331/17, 331/25
[51] Int. Cl. ..........................................H03b 3/04
[58] Field of Search ....................331/1 A, 17, 18, 25

[56] References Cited

UNITED STATES PATENTS

| | | | |
|---|---|---|---|
| 2,991,426 | 7/1961 | Aasen et al. | 331/17 X |
| 3,290,611 | 12/1966 | Horlacher et al. | 331/14 |
| 3,328,719 | 6/1967 | DeLisle et al | 331/17 |
| 3,337,813 | 8/1967 | Graeve | 331/17 |
| 3,383,619 | 5/1968 | Naubereit et al. | 331/17 X |

*Primary Examiner*—Roy Lake
*Assistant Examiner*—Siegfried H. Grimm
*Attorney*—Hanifin and Clark and Nathan N. Kallman

[57] ABSTRACT

A phase lock oscillator includes a phase discriminator that develops an error signal by comparing a clock from a voltage controlled oscillator with incoming random data bits. In the absence of data, the phase lock oscillator is inactive. However, when data is sensed, a logic and delay network in the phase discriminator develops an error voltage of suitable polarity and amplitude, indicative of the lead or lag between the data and clock signals. The error voltage is applied to the voltage controlled oscillator to modify the frequency and phase of the clock. Furthermore, first and second integrations are provided by the phase discriminator and an integrator respectively so that the steady state phase error is held close to zero.

2 Claims, 3 Drawing Figures

PATENTED OCT 24 1972 3,701,039

INVENTORS
PAUL C. LANG
ANTHONY N. LA PINE
JULIAN E. VAUGHN
BY Nathan N. Kallman
ATTORNEY

RANDOM BINARY DATA SIGNAL FREQUENCY AND PHASE COMPENSATION CIRCUIT

BACKGROUND OF THE INVENTION

1. Field of the Invention

This invention relates to a novel and improved Type II servosystem useful in a binary data processing apparatus, wherein a clock signal is synchronized with incoming random data.

2. Description of the Prior Art

In magnetic storage systems employed for recording and reproducing binary data signals, particularly high density or high frequency signals, it is important that each data pulse is referenced to discrete bit cells or time slots, or else the readout may be erroneous. Generally, the data pulse is referenced to a uniform clock or timing pulse of a related frequency, which defines the bit cell.

It is known that spurious variations in the mechanical or electrical parameters of a storage system cause unwanted displacement and shift of the signal being processed, thus necessitating frequency and phase compensation. To this end, synchronizing systems, servosystems, phase lock oscillator circuits, separation circuits and the like are employed.

Servosystems may be classified into three groups. A Type O servo acts as a frequency discriminator, comparing the signal frequency to a reference and correcting for signal or pulse position. A Type I servo provides a single integration, comparing signal phase to a reference in order to develop an error signal which varies the frequency of a timing oscillator, that may be used as the reference. A Type II servo provides correction of frequency and phase by means of double integration, and also compensates for D.C. drift.

It is apparent that when operating with high density data processing apparatus, wherein the clock and data pulses are closely packed, the phase as well as the frequency of the clock and data must be held to close tolerances in order to achieve an accurate readout. Therefore, a Type II servosystem is preferred for such apparatus. In most data storage systems, only the readback process is compensated for frequency and/or phase errors. It would also be advantageous to control the write function so that the clock and data are registered in substantially proper phase and frequency, thereby placing less stringent requirements on the readout circuits.

SUMMARY OF THE INVENTION

An object of this invention is to provide a Type II servosystem that is capable of processing random data and correcting for both frequency and phase errors.

Another object of this invention is to provide a data processing system, wherein a fixed phase relationship is substantially maintained between a reference timing signal and the data signal.

Another object is to provide a servosystem that acts to reduce steady state error in a phase lock oscillator, and maintains such error close to zero and substantially constant.

According to this invention, a servosystem comprising a phase lock oscillator includes a phase discriminator that develops an error signal, by comparing a timing signal or clock generated by a voltage controlled oscillator (VCO) and random data received from a storage means. In the absence of data, the closed loop servosystem is inactive and does not provide any frequency or phase compensation to the VCO. However, when random data is sensed, a logic and delay network acts to develop an error voltage of suitable polarity and amplitude, indicative of the lead or lag between the data and clock signals. The error signal is applied to the VCO to modify the frequency and phase of the clock in accordance with that of the sensed data. Furthermore, the closed loop servosystem of this invention employs first and second integrations whereby the steady state phase error is theoretically zero, but due to practical circuit limitations, the phase error does not in effect reach zero.

BRIEF DESCRIPTION OF THE DRAWING

The foregoing and other objects, features and advantages of the invention will be apparent from the following, more particular, description of a preferred embodiment of the invention, as illustrated in the accompanying drawing, in which.

DESCRIPTION OF THE PREFERRED EMBODIMENT

Figure 1:
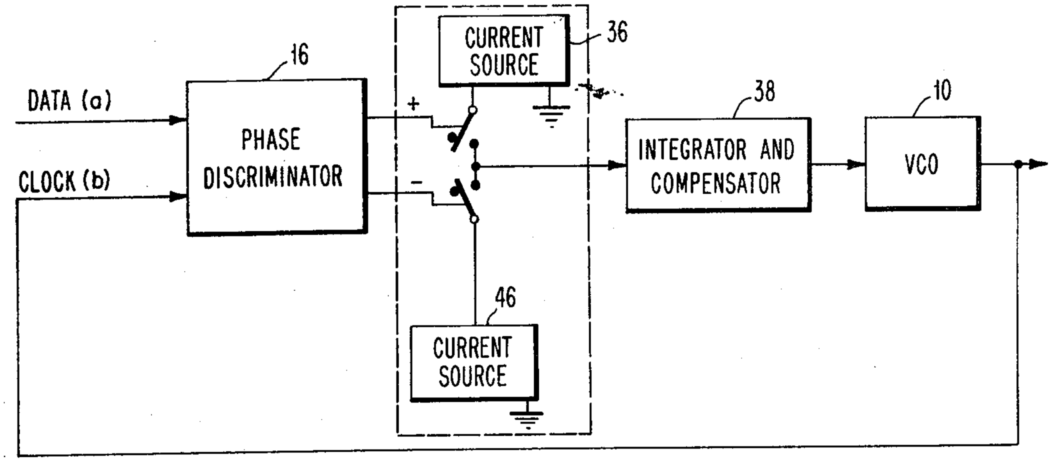
FIG. 1 is a schematic and block diagram of the phase lock oscillator utilized in a servosystem, in accordance with this invention.

With reference to the drawing, a Type II servo includes a phase lock oscillator that comprises a voltage controlled oscillator (VCO) 10 that operates at a nominal frequency, such as 7.22 megaHertz (MHz), for example, which may be the rate of incoming data to the phase lock oscillator circuit. The VCO produces a clock pulse 12 (FIG. 3*c*) having a frequency related to the frequency of the data signal 14 (FIG. 3*a*) being processed. The input data pulse 14 is applied to a digital phase discriminator 16 concurrently with the clock pulse 12 obtained from the output circuit of the VCO 10. Initially, the data provides lock-in or steady state error, but subsequently, the phase lock oscillator operates with random data to provide substantially zero steady state errors. The data and clock signals are compared to produce a phase error signal having a polarity and duration indicative of the phase relationship between the data and clock pulses.

Figure 2:
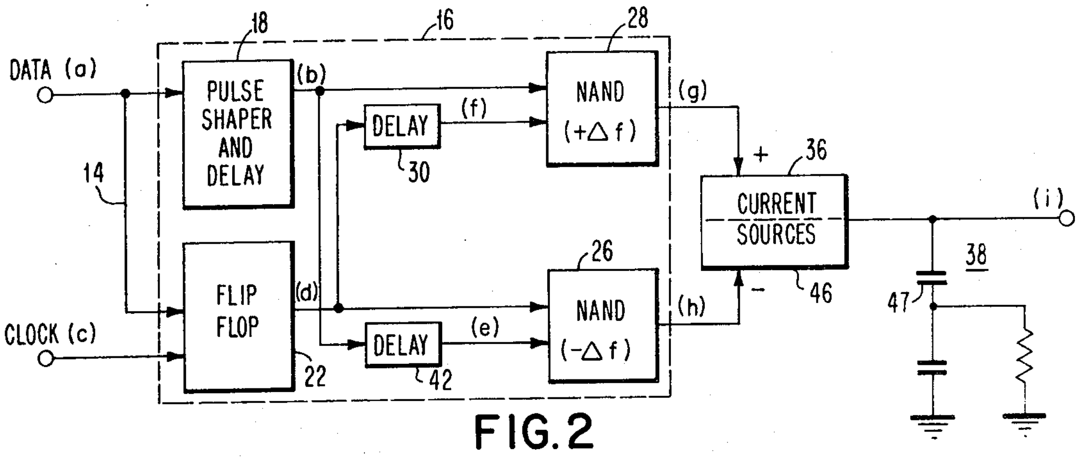
FIG. 2 is a schematic and block diagram illustrating a digital phase discriminator, such as employed in the circuit of FIG. 1.

An embodiment of the phase discriminator 16 used in the phase lock oscillator circuit of FIG. 1, in accordance with this invention, is illustrated in FIG. 2. The discriminator 16 includes a pulse shaper and delay circuit 18 that provides a single shot pulse 20 (FIG. 3*b*) in response to the leading edge of the data pulse. The negative going, trailing edge of the pulse 20 represents delayed data, the delay being about one-half of a bit cell period, by way of example.

The data pulse 14 is also applied to a bistable multivibrator or flip-flop 22. When data is present in the form of a binary 1 bit, the flip-flop 22 is set; whereas if a binary 0 appears, the flip-flop 22 remains reset and the phase lock oscillator is inactive. Therefore, it is apparent that the phase lock loop is operating only when data is sensed. Whenever the flip-flop 22 has been set by a data pulse, the next clock pulse 12 from the VCO is employed to reset the trigger 22.

In response to the clock and data, the flip-flop 22 develops a waveform 24 (FIG. 3d), having a negative-going transition in response to the leading edge of the data pulse 14, and a positive-going transition in response to the leading edge of each clock pulse 12, except when there is no data to set the flip-flop 22, i.e., no data pulse between the previous clock pulse and the instant clock pulse. This pulse waveform 24 defines the difference in phase between the data and clock pulses. The pulse signal 24 is directed to a NAND gate 26 when the frequency of the VCO 10 is to be decreased, or to a NAND gate 28 through a delay 30 for increasing the VCO frequency.

In the increase frequency channel, the output signal 24 from flip-flop 22 is delayed for about 5 nanoseconds, and delayed pulse 32 (FIG. 3f) is applied to NAND gate 28 in conjunction with the shaped data pulse 20. Whenever both the data pulse 20 and the delayed pulse 32 are down, or of negative polarity, a positive pulse 34 (FIG. 3*g*) is produced, having a duration equivalent to the time that the pulses 20 and 32 remain negative concurrently. The positive pulse output 34 is switched through a current source 36, that develops a current of duration representative of the phase error between data and clock. This current is applied to an integrating and compensating network 38 to provide an error voltage that serves to vary the oscillator 10, as disclosed in copending patent application, Ser. No. 754,883, entitled "Phase Compensation Circuit" filed Aug. 23, 1968, and assigned to the same assignee.

Figure 3:
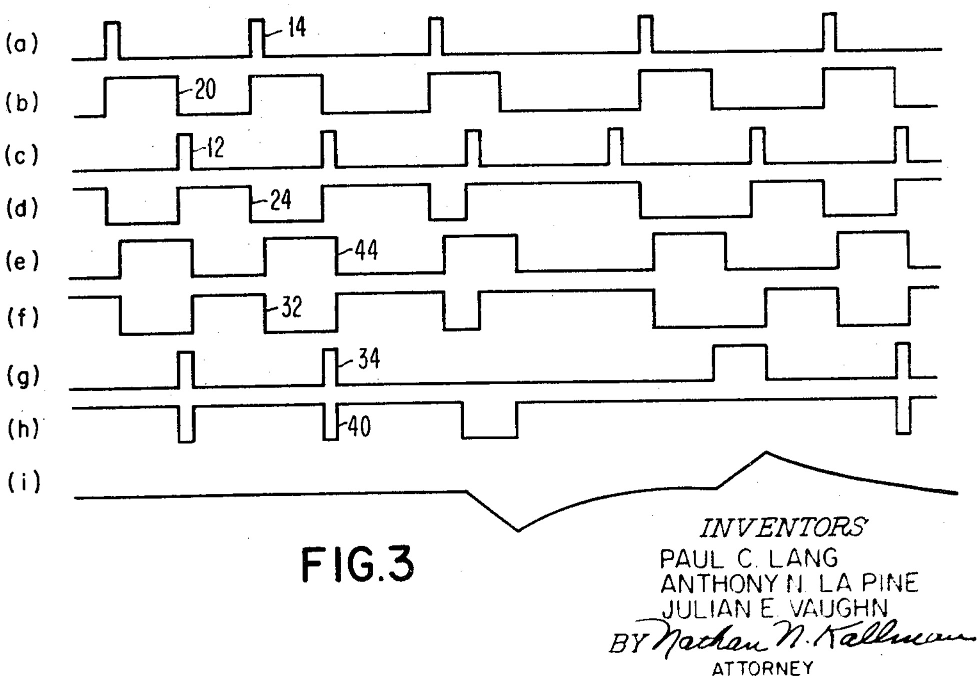
FIG. 3 is a series of waveforms to aid in the explanation of the invention.

On the other hand, when the phase difference between data and clock necessitates a decrease in frequency of the VCO 10, i.e., when the data is arriving late, then a negative pulse 40 (FIG. 3h) is developed by the decrease frequency channel. This negative pulse 40 is produced by NAND gate 26 in response to the output 24 from flip-flop 22, and by the shaped data pulse 20, which is delayed for about 5 nanoseconds by delay circuit 42, and applied as pulse 44 (FIG. 3*e*). Delays 30 and 42 compensate for the rise and fall time of the logic circuit and act to eliminate "dead zones" in the phase detection process. When there is zero error, both delay channels are active, but the net current to the compensator 38 is zero. The negative pulse 40 is generated whenever signals 24 and 44 are both up, or positive. The negative pulse 40 is switched through a current source 46 to the integrator and compensator 38 and then to the VCO 10, in a manner to reduce phase lead between the data and clock pulses.

A feature of this invention is that the phase discriminator 16 provides a first integration, and the integrator and compensator 38 achieve a second integration for correction of phase and frequency errors. The first integration is accomplished by the simultaneous application of the data frequency signal, and the clock frequency signal from the voltage controlled oscillator 10, to the phase discriminator 16. It is known that frequency is a first derivative of phase, that is, $f=d\phi/dt$, where $f$ is frequency, $d\phi$ is change in phase over an interval $dt$. The comparison of these two frequency signals in the digital phase discriminator 16 produces a phase error signal voltage that is applied to energize a current source 36 or 46. It is thus apparent that when a frequency signal is changed to a phase signal, that an integration has been achieved, which is performed by the phase discriminator of the closed loop circuit of this invention. The error signal is integrated until the pulse width, defined by the current to the integrating capacitor 47 is zero, thus achieving substantially a zero steady state error. In addition, random data can be processed by use of the novel phase lock oscillator circuit. In the absence of data, the closed loop servo is not activated to provide a correction, and therefore does not generate any false error correction.

While the invention has been particularly shown and described with reference to a preferred embodiment, it will be understood by those skilled in the art that changes in form and details may be made therein without departing from the spirit and scope of the invention. For example, another type integrator may be utilized in lieu of the gated current source integrator depicted in the drawing.

What is claimed is:

1. A signal phase compensation circuit for processing random data comprising:
   - a voltage controlled oscillator for providing a timing signal having a nominal frequency related to the frequency of an incoming random data signal;
   - means for detecting the phase of such incoming random data signal and for comparing said detected phase to the phase of the timing signal to produce a phase error signal, said detecting means being inactive in the absence of input data;
   - means coupled to said detecting means for transforming said phase error signal to an electric current;
   - an integrating circuit for developing an error voltage in response to said electric current;
   - said voltage controlled oscillator being coupled between said integrating circuit and said detecting means;
   - said detecting means comprising a digital phase discriminator having first and second channels for respectively increasing and decreasing the frequency of said voltage controlled oscillator, said first and second channels including delays for allowing said phase compensation circuit to operate outside of dead zone areas.

2. A signal phase compensation circuit for processing random data comprising:
   - a voltage controlled oscillator for providing a timing signal having a nominal frequency related to the frequency of an incoming random data signal;
   - means for detecting the phase of such incoming random data signal and for comparing said detected phase to the phase of the timing signal to produce a phase error signal, said detecting means being inactive in the absence of input data;
   - means coupled to said detecting means for transforming said phase error signal to an electric current;
   - an integrating circuit for developing an error voltage in response to said electric current;
   - said voltage controlled oscillator being coupled between said integrating circuit and said detecting means;

said detecting means comprising a digital phase discriminator that includes a bistable multivibrator, which is set in response to said random data signal, and is reset in response to said timing signal.

* * * * *